United States Patent [19]
Schultz Yamasaki et al.

[11] Patent Number: 6,156,394
[45] Date of Patent: *Dec. 5, 2000

[54] POLYMERIC OPTICAL SUBSTRATE METHOD OF TREATMENT

[75] Inventors: Nancy Lee Schultz Yamasaki, Santa Rosa, Calif.; Ludvik Martinu; Jolanta E. Klemberg-Sapieha, both of Montreal, Canada

[73] Assignee: Optical Coating Laboratory, Inc., Santa Rosa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/063,622

[22] Filed: Apr. 17, 1998

[51] Int. Cl.$^7$ ........................................... H05H 1/00

[52] U.S. Cl. .................. 427/536; 427/162; 427/255.395; 427/296; 427/307; 427/322; 427/508; 427/534; 427/558; 427/559; 427/569; 427/575

[58] Field of Search ................................. 427/534, 508, 427/536, 558, 559, 575, 569, 162, 307, 322, 296, 255.395

[56] References Cited

U.S. PATENT DOCUMENTS 5,068,021  11/1991  Sichmann et al. .
5,400,317   3/1995  Strasser et al. .
5,403,663   4/1995  Sichmann et al. .

OTHER PUBLICATIONS

Conley, D.J.; Rzad, S.J.; Burrell, M.; and Chera, J., "Surface Modification and Paint Adhesion," Polymeric Materials & Science & Engineering, vol. 62—Conference Proceedings, pp. 447–451, Boston, Ma, Spring, 1990 (No month avail.).

Preuss, S.; Langowski, H.C.; Damm, T.; and, Stuke, M., "Incubation/Ablation Patterning of Polymer Surfaces with sub–um Edge Definition for Optical Storage Devices," Appl. Phys. A 43, 360–362 (1992) (No month avail.).

Renschler, Clifford L. and Martinez, Robert J., "Study of a Potential Abrasion–Resistant Lens Coating:Adhesion to PMMA," Solar Energy vol. 36, No. 1, pp. 1–2, 1986 (No month avail.).

Ponter, A.B.; Jones, W.R., Jr.; and, Jansen, R.H., "Surface Energy Changes Produced by Ultraviolet–Ozone Irradiation of Poly(Methyl Methacrylate), Polycarbonate, and Polytetrafluoroethylene," Polymer Engineering and Science,, vol. 34, No. 16, pp. 1233–1238, Aug., 1994.

Lazare, Sylvain; Hoh, Peter D.; Baker, John M.; and Srinivasan, R., "Controlled Modification of Organic Polymer Surfaces by Continuous Wave Far–Ultraviolet (185 nm) and Pulsed–Laser (193 nm) Radiation: XPS Studies," J. Am. Chem. Soc. 106, pp. 4288–4290, 1984 (No month avail.).

Milde, F.; Goedicke, K,; and, Fahland, M., "Adhesion Behavior of PVD Coatings on ECR Plasma and Ion Beam Treated Polymer Films," Thin Solid Films 279, pp. 169–173 (1996) (No month avail.).

Holländer, Andreas and Wertheimer, Michael R., "Vacuum Ultraviolet Emision from Microwave Plasmas of Hydrogen and its Mixtures with Helium and Oxygen," J. Vac. Sci. Technol. A 12(3), pp. 879–880, May/Jun., 1994.

(List continued on next page.)

Primary Examiner—Bernard Pianalto
Attorney, Agent, or Firm—Workman, Nydegger & Seeley

[57] ABSTRACT

A pretreatment method for use in manufacturing an improved optical component comprises (i) providing a polymeric optical substrate; and (ii) exposing the polymeric optical substrate to electromagnetic energy having a wavelength of about 30 nm to about 350 nm. The exposure of the polymeric optical substrate to the electromagnetic energy substantially improves adhesion between the substrate and an optical coating deposited onto the substrate following pretreatment. The invention addresses the significant need for coated plastic optics by providing a method to achieve reliable adhesion of optical coatings placed on polymeric optical substrates. Specifically, this invention enables improved adhesion for even highly curved or shaped parts which have been historically more difficult to coat. The pretreatment method is particularly useful for molded substrates such as molded polymethylmethacrylate.

24 Claims, 7 Drawing Sheets

OTHER PUBLICATIONS

Liston, E.M.; Martinu, L.; and, Wertheimer, M.R., "*Plasma Surface Modification of Polymers for Improved Adhesion: a Critical Review,*" J. Adhesion Sci. Technol., vol. 7, No. 10, pp. 1091–1127 (1993) (No month avail.).

Shi, M.K.; Selmani, A.; Martinu, L.; Sacher, E.; Wertheimer, M.R.; and, Yelon, A., "*Fluoropolymer Surface Modification for Enhanced Evaporated Metal Adehesion,*" J. Adhesion Sci. Technol., vol. 8, No. 10, pp. 1129–1141, 1994 (No month avail.).

Liston, E.M.; Martinu, L.; and, Wertheimer, M.R., "*Plasma Surface Modification of Polymers for Improved Adhesion: a Critical Review,*" J. Adhesion Sci. Technol. vol. 7, No. 10, pp. 1091–1127, 1993 (No month avail.).

Martinu, L.; Klemberg–Sapieha, J.E.; Küttel, O.M.; Raveh, A.; and, Wertheimer, M.R., "*Critical Ion Energy and Ion Flux in the Growth of Films by Plasma–Enhanced Chemical–Vapor Deposition,*" J. Vac. Sci. Technol. A 12(4), pp. 1360–1364, Jul./Aug. 1994.

Reinke, P.; Bureau, S.; Klemberg–Sapieha, J.E.,; and, Martinu, L., "*Ion Energy Distributions in Dual–and Single–Mode Microwave/Radio–Frequency Plasma,*" J. Appl. Phys. 78(8), pp. 4855–4858, Oct. 15, 1995.

Klemberg–Sapieha, J.E.; Küttel, O.M.; Martinu, L.; and, Wertheimer, M.R., "*Dual Microwave–R.F. Plasma Deposition of Functional Coatings,*" Thin Solid Films, 193, 194, pp. 965–972, 1990 (No month avail.).

Leroux, P.; Raveh, A.; Klemberg–Sapieha, J.E.; and, Martinu, L., "Mechanical Properties of Plasma Deposited Functional Coatings Determined by Microscratch Measurements," Society of Vacuum Coaters, 36th Annual Technical Conference Proceedings, 1993 (No month avail.).

Vallon, S.; Drévillon, B.; Poncin–Epaillard, F.; Klemberg–Sapieha, J.E.; and, Martinu, L., "*Argon Plasma Treatment of Polycarbonate: in situ Spectroellipsometry Study and Polymer Characterizations,*" Published JVSTA 14(6), pp. 3194–3201, Nov./Dec. 1996.

Esrom, Hilmar and Kogelschatz, Ulrich, "*Modification of Surfaces with New Excimer UV Sources,*" Thin Solid Films, 218, pp. 231–246 (1992) (No month avail.).

Holländer, Andreas and Wertheimer, Michael R., "*Vacuum Ultraviolet Emission from Microwave Plasmas of Hydrogen and its Mixtures with Helium and Oxygen,*" J. Vac. Sci. Technol. A 12(3), pp. 879–882, (May/Jun. 1994).

Klemberg–Sapieha, J.E., "*Scanning Probe Microscopy on Polymer Surfaces,*"Plasma Processing of Polymers, pp. 233–245, (1997) (No month avail.).

Martinu, L., "*Plasma Deposition and Testing of Hard Coatings on Plastics,*" Plasma Processing of Polymers, pp. 247–272, (1997) (No month avail.).

"*New Material & Products,*"Plastics Industry News, vol. 34, No. 4, pp. 51–52, (Apr. 1988).

POLYMERIC OPTICAL SUBSTRATE METHOD OF TREATMENT

BACKGROUND OF THE INVENTION

1. The Field of the Invention

The present invention relates to polymeric optical substrates and coatings thereon. More specifically, the invention relates to a method for pretreating polymeric optical substrates in order to improve the adhesion of optical coatings to the substrates.

2. The Relevant Technology

Polymeric optical substrates such as polycarbonate and polymethyl methacrylate ("PMMA") are useful in a variety of different optical components such as lenses, optical filters, and the like. Commonly, such polymeric optical substrates are coated with optical coatings, such as interference coatings, antireflective coatings, and other conventional optical coatings.

However, adhesion of optical coatings onto these and other polymeric optical substrates is often problematic and unsatisfactory. Lack of sufficient adhesion of coatings to polymeric optical substrates can result in premature peeling or delamination of the coatings from the substrates, easy scratching of the coatings, and uneven distribution of coating layers on substrates.

It is believed that lack of sufficient adhesion of coatings to polymeric optical substrates is due in part to the ease in damaging the polymeric material during exposure to energetic particles before a coating is applied. This damage includes loss of material through etching and ablation, bond scission, and forming of weak boundary layers in the polymeric material.

SUMMARY AND OBJECTS OF THE INVENTION

It is therefore an object of the invention to provide an improved optical component.

It is another object of the invention to provide an improved method for manufacturing optical components.

It is another object of the invention to provide an improved method for pretreating polymeric optical substrates.

It is another object of the invention to improve adhesion between the substrates and a coating subsequently placed on the substrates.

It is another object of the invention to provide an improved pretreated polymeric optical substrate.

It is another object of the invention to provide improved techniques for storing polymeric optical substrates.

To achieve the foregoing objects and in accordance with the invention as embodied and broadly described herein, the present invention provides an improved optical component and a method for manufacturing an optical component.

Optical substrates preferably have good optical transmission in the visable region, approximately 400 nm to 700 nm without haze or cloudiness. The optical substrates are thus preferably visually clear. Other desirable properties for optical substrates can include low refractive indexes to decrease transmission loss due to reflection, for example. Optical substrates can also be selected based on material properties such as cost, hardness, weight, chemical resistance, and compatibility, among other factors. The methods of the present invention can be employed to provide substrates and components having these qualities and other advantages.

The manufacturing method comprises (i) providing a polymeric optical substrate; and (ii) exposing the polymeric optical substrate to electromagnetic energy having a wavelength of about 30 nm to about 350 nm. The exposure of the polymeric optical substrate to a wavelength in this range of electromagnetic energy substantially improves adhesion between the substrate and an optical coating deposited onto the substrate following pretreatment. The electromagnetic energy may be applied through direct exposure or through remote exposure, for example.

The invention addresses the significant need for improved coated plastic optics by providing a method to achieve reliable adhesion of optical coatings placed on polymeric optical substrates. The invention provides improved adhesion for even highly curved or shaped parts which have been historically more difficult to coat.

The pretreatment method is particularly useful for substrates such as polymethyl methacrylate ("PMMA") which has been traditionally difficult to coat with reliable adhesion and is particularly susceptible to damage during pretreatment, but is valuable as an optical substrate in part because it is a lower refractive index optical material and therefore reduces reflection loss. The pretreatment process also protects polymeric optical substrates even if coatings are not later adhered to the substrates.

PMMA is often soft on the surface, making it readily susceptible to such damage. Pure PMMA (i.e. no conditioning agents or additives), for example, is useful for precision optical fabrication, but is particularly difficult to coat because of difficulty in adhering the coating to the PMMA. The pretreatment process of the present invention, however, significantly improves adhesion.

Furthermore, the pretreatment process of the present invention is particularly useful when a polymeric optical substrate, such as PMMA, has been molded. Traditionally, it has been more difficult to achieve adhesion between coatings and molded substrates, particularly molded PMMA, as compared to non-molded PMMA.

Surprising results are seen in the discovery of the present invention. Even though PMMA is generally more sensitive than other substrate materials, the high energy process of the present invention significantly improves adhesion between substrates such as PMMA and coatings subsequently deposited thereon.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE INVENTION

Figure 1:
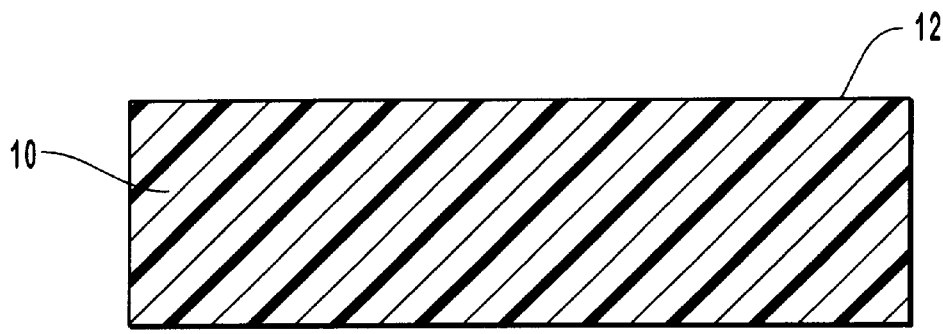
FIG. 1 represents a polymeric substrate.

The present invention is directed to an improved optical component and a method for manufacturing the improved component. The invention addresses the significant need for improved coated plastic optics by providing a method to achieve reliable adhesion of optical coatings placed on polymeric optical substrates. The "pretreatment" method is particularly useful for substrates such as polymethyl methacrylate ("PMMA") which has been traditionally difficult to coat with reliable adhesion and is particularly susceptible to damage during pretreatment, but is valuable as an optical substrate.

One embodiment of the manufacturing method of the present invention comprises: (i) providing a polymeric optical substrate; (ii) exposing the polymeric optical substrate to electromagnetic energy having a wavelength of about 30 nm to about 350 nm, thereby forming a pretreated interface layer on the substrate; and (iii) depositing an optical coating on the interface layer to form the improved optical component.

By initially exposing a polymeric optical substrate to electromagnetic energy in the desired range, thereby forming a pretreated substrate, the adhesion qualities of the substrate are vastly improved. Thus, when the substrate is coated with an optical coating, the coating has significantly greater adhesion to the substrate.

Examples of material for making the polymeric optical substrates useful in the present invention include (i) acrylate containing polymers such as polymethylmethacrylate ("PMMA") and other acrylics or acrylate containing polymers sensitive to photo or thermal crosslinking, such as polyethyl acrylate; (ii) polycarbonate; (iii) a variety of other polymers, including polyethylene terephthalate, polyimide, polystyrene, polyester, polyethylene, and a variety of different epoxy containing polymers; and (iv) mixtures and derivatives thereof.

Additional examples of acrylate containing polymers include methyl methacrylate butadiene styrene terpolymer, hydroxypropyl methacrylate, poly(2-hydroxyethyl methacrylate), poly(methacrylamide), poly(n-butyl methacrylate) and poly(propyl methacrylate). One example of a derivative of polycarbonate which can be successfully used in the present invention includes CR39. Treatment of these and other polymeric optical substrates according to the methods of the present invention results in substantially improved adhesion of optical coatings to the substrates.

In a preferred embodiment, the electromagnetic energy exposed to the substrate has a wavelength of about 30 nm to about 350 nm, more preferably about 30 nm to about 300 nm, more preferably about 50 nm to about 200 nm, and most preferably about 50 nm to about 150 nm. Exposure of polymeric optical substrates at these electromagnetic energy wavelengths markedly improves adhesion of subsequent coatings such as vacuum deposited coatings onto the substrate. Exposure of the substrate to the appropriate wavelength of electromagnetic energy forms a pretreated interface layer on the substrate, rather than damaging the substrate.

A variety of different methods may be employed to generate the wavelengths desired for use in the invention. For example, exposure of the polymeric optical substrate to the appropriate electromagnetic energy may be by exposure of the substrate to energy emitted from a gas plasma formed by exciting a gas such as helium, hydrogen, nitrogen, argon, and other gases. The plasma may be an rf excited plasma or a microwave excited plasma, for example. Exposure to the energy of the gas plasma may be direct or remote.

In the direct exposure approach, the gas plasma itself is exposed directly to the substrate, surrounding the substrate and bombarding the substrate with energetic particles. A variety of different suitable gas plasmas may be used for this process, including helium, hydrogen, argon, and nitrogen, for example. Helium gas plasma is preferred for the direct pretreatment of PMMA. By way of example, energy emitting gas plasma can be formed by placing a gas into a chamber with the substrate, then exciting the gas with energy such as light, heat, microwave, or rf energy. Examples of suitable chambers for this process will be discussed in further detail below.

In the remote approach, the energy is applied from an energy source through a window. In an example of a remote approach, the electromagnetic energy comprises an energy source, such as a lamp or an electromagnetic energy emitting gas plasma, contained in one chamber. The substrate is contained in an adjacent second chamber and a window permeable to electromagnetic energy separates the first and second chambers. Exposure to the desired electromagnetic energy is performed through emission of electromagnetic energy through the window. The window only allows electromagnetic energy having a certain wavelength, such as a wavelength of 114 nm or more in certain windows, such as $MgF_2$, for example, to pass through the window onto the substrate. The window does not allow plasma to flow through and thus acts as filter. Such remote scenarios are preferably carried out under vacuum conditions.

These remotely applied or directly applied treatment possibilities provide the practitioner with a variety of different options for pretreating the substrates. A variety of different gas plasmas may serve as examples of energy sources for the remote exposure process, including hydrogen gas plasma, helium gas plasma, argon gas plasma, and nitrogen gas plasma. Helium and hydrogen gas plasmas are preferred for PMMA pretreatment.

The preferred exposure involves exposing the substrates to an environment designed to avoid interference or absorption of the desired electromagnetic energy emissions. The environment should not absorb or react with the electromagnetic energy emitted. For example, in one direct exposure process, the environment has a pressure of about 100 mTorr to about 200 mTorr, while one remote exposure process is carried out under vacuum conditions such as about $10^{-6}$ Torr.

These pressure ranges are not limiting, however, and upon reviewing the disclosure herein one skilled in the art will be able to expose the substrate to the desired electromagnetic energy wavelength using a variety of different pressure ranges in order to achieve the desired exposure. For example in one embodiment, the remote exposure process is carried out in an environment having a pressure of about $10^{-10}$ Torr to about one atmosphere, preferably about $10^{-10}$ Torr to about 100 Torr, more preferably about $10^{-10}$ Torr to about $10^{-3}$ Torr.

In an embodiment of the direct exposure process, the process is carried out in an environment having a pressure of about $10^{-5}$ Torr to about one atmosphere, more preferably about $10^{-4}$ Torr to about 1 atmosphere. These ranges for the direct process include pressure applied by the gas plasma exposed to the substrate.

Thus, one example of a method for manufacturing an optical component according to a direct exposure method comprises providing a polymeric optical substrate and pretreating the optical substrate by: (i) placing the substrate into an environment having a pressure of about 100 mTorr to about 200 mTorr; and (ii) exposing the substrate to direct vacuum ultraviolet plasma emitting energy having a wavelength in a range of about 30 nm to about 200 nm. The substrate is then coated with optical coating. One method for pretreating a polymeric optical substrate according to the remote method comprises: (i) placing the substrate into an environment having a pressure of about $10^{-6}$ Torr; and (ii) exposing the substrate to remote vacuum ultraviolet plasma emitting energy having a wavelength in the range of about 30 nm to about 200 nm.

Using either the direct or remote treatment process, it is possible to pretreat substrates during storage prior to coating, or to treat the substrates and then store them in appropriate conditions, e.g., in a vacuum, until final processing occurs. The invention thus enables static storage of the substrate following the pretreatment of the polymeric substrate.

Although exposure to electromagnetic energy within the disclosed ranges can immediately increase adhesion, such as within about five minutes or possibly less depending on treatment conditions of flow rate and intensity of energy, pretreatment for longer periods of time is often preferable depending on the wavelength, flow rate, and intensity of electromagnetic energy used. Other factors relating to exposure time include the amount of adhesion needed in a particular circumstance and the source of electromagnetic energy employed, such as direct exposure, remote exposure and the properties of the particular plasma employed. In addition, it may be desirable to store the substrate within a chamber while being exposed over a long period of time to a smaller amount of energy.

Pretreatment of the surface of a substrate according to the present invention changes the surface chemistry of the substrate to provide sites for chemical bonding with a variety of different optical coatings. Pretreatment of a substrate according to the present invention thus changes the stoichiometry of at least the surface of the substrate. Substrates pretreated according to the present invention also exhibit increased resistance to acetone damage.

The changes in stoichiometry and increased resistance to acetone damage suggest that the pretreatment method of the present invention forms cross-linked bonds within the surface interface layer as a consequence of the plasma treatment. This mechanically stabilizes the surface (i.e., increased Young's modulus and hardness). According to one method, direct plasma and remote radiation exposure leads to formation of a cross-linked interface layer of up to about 100 nm thick, possibly about 5 nm to about 100 nm thick, and possibly about 40 nm to about 80 nm thick, depending upon the specific treatment conditions. In addition, pretreatment may cause physical surface changes such as increased or decreased roughness. These physical changes may act in concert with the chemical changes to improve adhesion.

Thus, one embodiment of the present invention is a method for creating chemical bonding sites on a polymeric optical substrate in order to improve adhesion of an optical coating to the substrate. One method, for example, comprises altering the ratio of carbon and oxygen within a suitable substrate. Thus, in one embodiment, the pretreated upper interface layer of the substrate has a ratio of carbon to oxygen which is substantially different from that of the untreated portion of the substrate.

For example, in one embodiment, the method increases the ratio of carbon to oxygen to a ratio in the range of about 3 to about 1, respectively, to about 25 to about 1, respectively. In another embodiment, the method increases the ratio of carbon to oxygen to a ratio in the range of about 3 carbon atoms to about 1 oxygen atom to about 20 carbon atoms to about 1 oxygen atom. In another embodiment, the method increases the ratio of carbon to oxygen to a ratio in the range of about 3 carbon atoms to about 1 oxygen atom to about 15 carbon atoms to about 1 oxygen atom. In other embodiments, the method increases the ratio of carbon to oxygen to a ratio in the range of about 3 to about 1, respectively, to about 10 to about 1, respectively, about 5 to about 1, respectively, or about 4 to about 1, respectively.

In another embodiment, the pretreated portion has an amount of carbon which is substantially different from that of the untreated portion of the substrate. For example, in one embodiment, the method increases the amount of carbon in the treated portion of the substrate by at least about 0.5 atomic percent (i.e., percentage of atoms). In another embodiment, the method increases the amount of carbon in the treated portion of the substrate by about 0.5 atomic percent to about 50 atomic percent. In another embodiment, the method increases the amount of carbon in the treated portion of the substrate by about 1 atomic percent to about 15 atomic percent.

Figure 2:
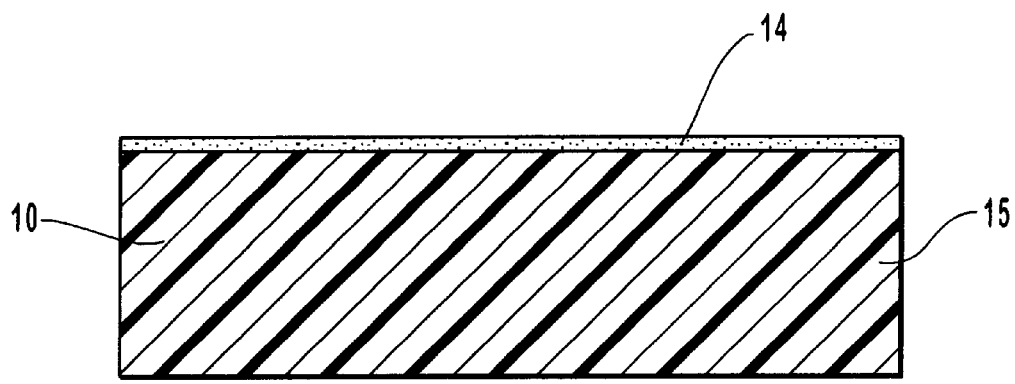
FIG. 2 represents the polymeric substrate of FIG. 1 which has had the exterior surface thereof pretreated, forming a pretreated interface layer.
Figure 3:
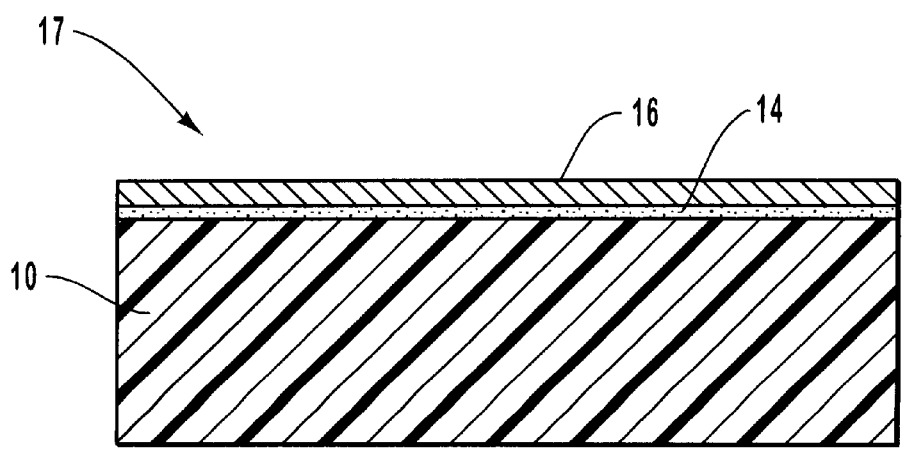
FIG. 3 represents an optical component comprising the substrate of FIG. 2 and a coating deposited onto the pretreated interface layer of the substrate.

With reference now to FIGS. 1 through 3, one embodiment of a manufacturing method of the present invention comprises: (i) providing a polymeric optical substrate 10 having an exterior surface 12; (ii) exposing polymeric optical substrate 10 to electromagnetic energy having a wavelength of about 30 nm to about 350 nm, thereby forming a "pretreated" upper interface layer 14 on substrate 10; and (iii) depositing an optical coating 16 on upper interface layer 14 to form an improved optical component 17.

Figure 4:
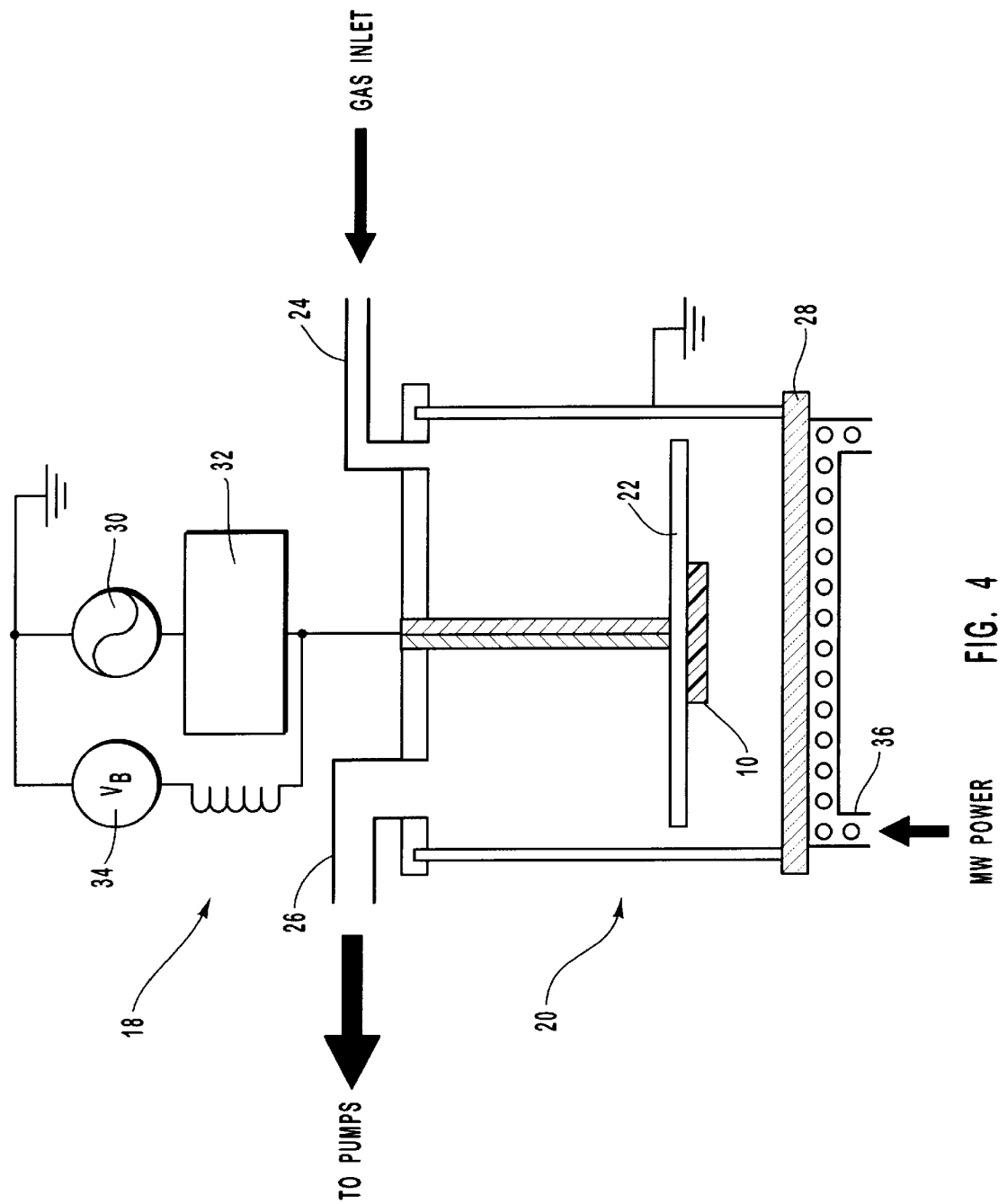
FIG. 4 is a schematic illustration of a direct exposure microwave/rf dual-frequency plasma system having the polymeric substrate of FIG. 1 coupled thereto.

With reference now to the schematic of FIG. 4, in one embodiment of the direct exposure approach, substrate 10 is exposed to a direct electromagnetic energy source within a plasma chamber such as a microwave/rf dual frequency plasma system 18. One embodiment of a plasma system 18 comprises a chamber 20 having an rf powered substrate holder/electrode 22 therein. A gas inlet pipe 24 and a gas outlet pipe 26 extend into chamber 20. Chamber 20 has quartz window 28 in one wall thereof. An rf power supply 30 is electrically coupled to chamber 20, along with a matching unit 32, a bias voltage 34, and a microwave power source 36 adjacent window 28.

In one embodiment, in order to pretreat substrate 10 through direct exposure, substrate 10 is first placed onto substrate holder 22 of system 18 after which air within chamber 20 is pumped out of chamber 20, thereby creating a desired vacuum level. The desired gas, such as helium gas, is then allowed to flow into chamber 20 and is then excited using microwave power from microwave power source 36, rf power supply 30, both, or another source of energy, after which the gas plasma surrounds and emits energy into substrate 10.

It will be appreciated, however, that direct exposure may occur within a simpler or more complex system. For example, in one embodiment, only the microwave power supply is provided and the system does not employ an rf power supply.

Figure 5:
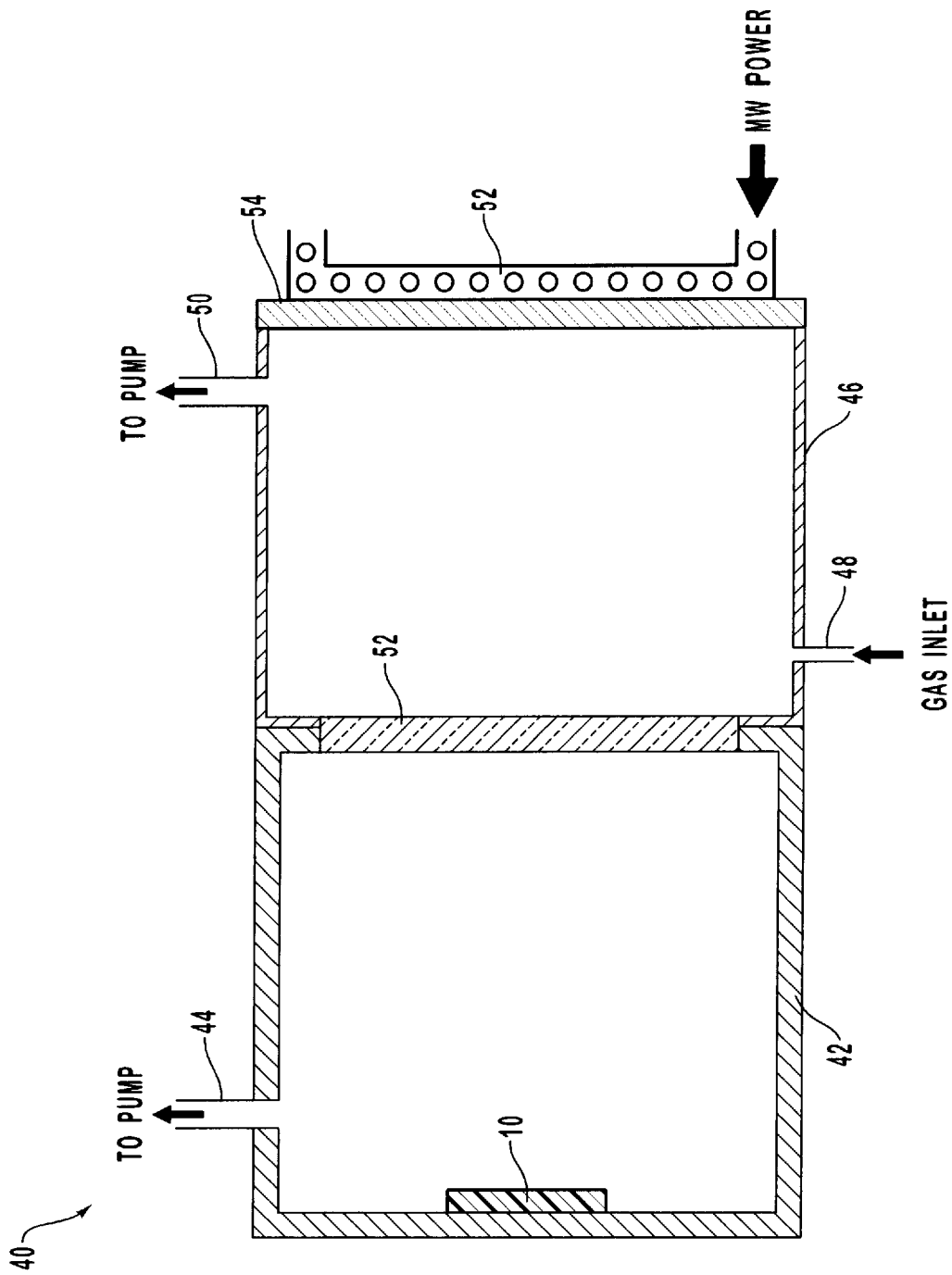
FIG. 5 is a schematic illustration of a remote exposure dual chamber system having the polymeric substrate of FIG. 1 coupled thereto.

With reference now to the schematic of FIG. 5, in one embodiment of the remote exposure approach, substrate 10 is exposed to a remote electromagnetic energy source within a double cavity system 40. One embodiment of a double cavity system 40 comprises a sample chamber or compartment 42 having a gas outlet pipe 44 coupled thereto. Chamber 42 is disposed adjacent a plasma chamber 46 having a gas inlet pipe 48 and a gas outlet pipe 50 coupled thereto. A window 52, such as a $MgF_2$ window having a wavelength cut off of 114 nm, is disposed between sample chamber 42 and plasma chamber 46. A power source such as a microwave power source 52 irradiated through a window 54 of plasma chamber 46 is coupled to an opposing end of plasma chamber 46. In another embodiment, an rf power source is coupled to plasma chamber 46 instead of or in addition to microwave power source 52 and window 54.

In one embodiment, in order to pretreat substrate 10 through remote exposure, substrate 10 is first placed into sample chamber 42, after which air within sample chamber 42 is pumped out of chamber 42, thereby creating a reduced pressure. The desired gas, such as helium or hydrogen gas, is then allowed to flow into plasma chamber 46, and is then excited using microwave power from microwave power source 52, an rf power supply, both, or another source of energy. The resulting gas plasma emits energy through the window into substrate 10.

It will be appreciated, however, that remote exposure may occur within a simpler or more complex system. For example, in one embodiment, a quartz tube serves as the plasma chamber 46 in which the plasma zone is formed.

Following pretreatment, substrate 10 is coated with a coating 16, forming improved optical component 17. A variety of optical coatings may be deposited onto substrates pretreated according to the present invention, including for example, silicon nitride, titania, tantala, niobia, zirconia, alumina, silicon dioxide, and mixtures and derivatives thereof. These and other films may be deposited through a variety of different methods, including chemical vapor deposition, plasma chemical vapor deposition, evaporation, sputtering, or wet chemical techniques, for example.

The coating step may occur within the same chamber 20, for example, in which pretreatment occurred. In one embodiment, substrates 10 are stored on a long term basis in a chamber under exposure to the appropriate electromagnetic energy until needed, after which they are coated when desired. In another embodiment, substrates 10 are exposed to the desired electromagnetic energy after which they are immediately coated. Optionally, however, it is possible for the practitioner to pretreat the samples within a chamber such as chamber 20, then transport the samples to a separate coating chamber.

Another embodiment of a system useful for pretreating substrates and/or depositing film on substrates is disclosed in copending U.S. patent application Ser. No. 08/861,246, filed May 21, 1997 and entitled "Methods and Apparatus for Simultaneous Multi-sided Coating of Optical Thin Film Designs Using Dual-Frequency Plasma-Enhanced Chemical Vapor Deposition," invented by Nancy Yamasaki, et al. which is incorporated herein in its entirety by reference. Yet another embodiment of a system useful for pretreating substrates and/or depositing film thereon is disclosed in copending U.S. patent application filed Apr. 16, 1998 and entitled "Hybrid Cluster Tool For Depositing Optical Thin Films and Methods of Using Same", invented by Nancy L. S. Yamasaki, Chris H. Stoessel, and Alberto Argoitia, which is incorporated herein in its entirety by reference.

One example of an optical component 17 of the present invention thus comprises (i) a polymeric optical substrate 10, the polymeric optical substrate 10 having a pretreated upper surface 14; and (ii) a coating 16 deposited on the pretreated upper surface 14, wherein upper surface 14 is formed by being exposed in a low pressure environment to the appropriate energy. This invention is particularly useful because it can be employed in conjunction with a variety of different substrates without damaging the substrates, even substrates such as PMMA which are sensitive to pretreatment processes.

As shown in FIG. 2, in one embodiment, pretreated substrate 10 comprises an upper interface layer 14 and an untreated lower portion 15. It will be appreciated that in another embodiment, however, the entire substrate is pretreated according to the present invention, rather than treating merely part of the substrate, such as an upper interface layer 14. Thus, the lower portion may be either treated or untreated.

Surprising results are seen in the discovery of the present invention. Pretreatment of a PMMA substrate with a 365 nm wavelength emitting mercury lamp did not significantly improve adhesion between the substrate and an optical coating subsequently deposited onto the substrate. However, the higher energy process of the invention significantly improves adhesion between substrates such as PMMA and coatings subsequently deposited thereon. Surprisingly, even though PMMA is generally more sensitive than other substrate materials, the shorter wavelength, higher energy process of the invention improves adhesion between PMMA and optical coatings deposited thereon while the lower energy 365 nm mercury lamp did not improve adhesion.

EXAMPLE 1

Testing of Optical Substrates Comprising Film Deposited on Untreated PMMA Substrates 1. Coating Method:

Untreated rectangular plates of reactive injection molded PMMA which were 2.5 millimeters thick, 75×15 mm in area were coated with about 500 nm thick hydrogenated amorphous silicon nitride ($SiN_{1.3}$) film under MW/RF conditions. The coating parameters were those leading to a high refractive index of approximately 1.80–1.85 at a deposition rate of about 8 Å/s. These coating conditions included the use of a gas mixture $SiH_4/NH_3$ (8 sccm/24 sccm) pressure, 120 mTorr, microwave power 100 W, rf power 30 W, and substrate bias $V_B$=−150.

2. Testing Method:

After the film was deposited, the samples were inspected for adhesion using a visual evaluation ("Visual Eval."), a scotch tape peel test (M610 type) and a microscratch test ("MST"). In the MST, a hemispherical Rockwell C diamond stylus was moved along the film surface, and a critical load, $L_c$, (measured in Newtons) was determined when the film started to delaminate from the interface.

After the first round of adhesion tests, which were at room temperature, the samples were exposed to a high humidity at an elevated temperature, relative humidity ("RH")=97%, 50 degrees C, for 24 hours, and the tape peel and visual evaluation tests were repeated.

3. Test Results:

As shown in Table 1, samples A–C of untreated PMMA initially exhibited no peeling/delamination ("No Peel") during visual inspections, but exhibited peeling during a tape peel test at room temperature, an Lc of 1.51 Newtons, 1.7 Newtons, and 1.4 Newtons, respectively, and peeling following the tape peel test at high humidity and temperature exposure for 24 hours ("97% RH"). The samples were also visually clear.

TABLE 1

Testing of Optical Substrates Comprising Film Deposited on Untreated PMMA Substrates

| Sample | Visual Eval. Room Temp | Tape Peel Test Room Temp. | Microscratch Test Lc[N] Room Temp. | Visual Eval. 97% RH | Tape Peel Test 97% RH |
|---|---|---|---|---|---|
| A | No Peel | Peeling | 1.51 | No Peel | Peeling |
| B | No Peel | Peeling | 1.7 | No Peel | Peeling |
| C | No Peel | Peeling | 1.4 | No Peel | Peeling |

EXAMPLE 2

Testing of Optical Substrates Comprising Film Deposited on PMMA Substrates Pretreated with Direct He Exposure 1. Pretreatment Method:

Rectangular plates of PMMA molded by reactive injection molding which were 2.5 millimeters thick, 75×15 mm in area were placed in system 18 on substrate holder/electrode 22 (18 cm in diameter) shown diagrammatically in FIG. 4. After turbomolecularly pumping the reactor down to a base pressure of $10^{-4}$ Torr, a helium gas was admitted using Sierra (Model 840) mass flow controllers, and the desired pressure was adjusted using a throttling valve and an MKS-Baratron capacitance pressure gauge.

Microwave power was supplied from a 2.45 GHz generator, and it was coupled to the reactor from a 30 cm long microwave periodic slow wave structure through a fused silica window 28 (located about 4 cm in front of each substrate). The substrate holder 22 was capacitively coupled to a radio frequency (RF, 13.56 MHz) power supply 30. The negative dc substrate-biased voltage (and hence the ion bombarding energy) was controlled by the applied RF power.

The PMMA plates were directly exposed to plasmas excited in helium gas using (i) microwave power of about 150 MW and/or rf power, as indicated in Table 2; (ii) flow rates varying between about 20 standard cubic centimeters per minute ("sccm") and about 50 sccm, as indicated in Table 2; and (iii) pressure varying between about 100 mTorr and 200 mTorr, for a variety of different time intervals, as reflected in Table 2.

2. Coating and Testing Method:

An amorphous silicon nitride film was then deposited on each plate according to the coating method discussed above in Example 1. The film depositions and pretreatments were performed in the same chamber without breaking vacuum.

The optical components comprising the film deposited on the substrate were then inspected for adhesion using a scotch tape peel test (M610 type) and a microscratch test ("MST"). In the MST, a hemispherical Rockwell C diamond stylus was moved along the film surface, and a critical load, $L_c$, (measured in Newtons) was determined when the film started to delaminate from the interface.

After the first round of adhesion tests, which were at room temperature, the samples were exposed to a high humidity at an elevated temperature, relative humidity ("RH")=97%, 50 degrees C, for 24 hours, and the adhesion tests were repeated.

3. Test Results:

As shown in Table 2, upon reaching five minutes of pretreatment, most samples of pretreated PMMA optical components exhibited only traces of peeling/delamination, i.e. decreased peeling ("Trace P.") or no peeling/delamination ("No Peel") during a tape peel test, and increased $L_c$ values, indicating an increased amount of force that is needed to tear a film off of the pretreated substrate compared to the untreated substrate of Example 1. The pretreated components also featured decreased peeling during a tape peel test following high humidity (97% RH) and temperature exposure for 24 hours compared to the untreated samples of Example 1. Thus, an improvement in adhesion for direct He pretreatment was demonstrated over the untreated PMMA substrate of Example 1, which exhibited peeling rather than merely trace delamination or no delamination. The pretreated optical components were visually clear.

The highest adhesion was obtained after about 25 minutes of pretreatment, although this result may vary depending upon the other conditions of pressure, flow and power. It is also believed that different pressure conditions, flow conditions, and/or power conditions can decrease the amount of time required to achieve no delamination or peeling. For example, it is shown that the use of rf power in sample H increases the critical load value over sample G, all other values being equal.

The microscratch test results and visual inspection for tape testing demonstrate good adhesion. The tests demonstrate a marked improvement in adhesion such as greater load-to-failure resulting from He plasma treatment. Scratching required much greater force because of the adhering qualities resulting from pretreatment.

Helium gas plasma emits electromagnetic energy having wavelengths of 164 nm and 58 nm, demonstrating that these wavelengths successfully pretreat substrates for improved adhesion with optical films.

In other tests, pretreatment of two different samples of PMMA with direct hydrogen gas plasma at 200 mTorr, 20 sccm for 60 seconds with either (i) 150 W microwave power, or (ii) rf power of 30 W, bias −150V, and subsequent film coating, resulted in an optical component exhibiting peeling upon visual evaluation at room temperature and during a tape peel test at room temperature.

EXAMPLE 3

Testing of Optical Substrate Comprising Film Deposited on PMMA Substrate Pretreated with Direct He/N$_2$ Exposure 1. Pretreatment Method:

An injection molded rectangular plate of PMMA was pretreated as described in the pretreatment method of Example 2 except that the PMMA plate was subjected to direct exposure of helium gas plasma for fifteen minutes, then direct exposure of nitrogen gas plasma for three minutes.

2. Coating and Testing Method:

An amorphous silicon nitride film was then deposited on the plate according to the coating method discussed above in Example 2, after which the resulting optical component was then tested as described in Example 2.

3. Test Results:

As shown in Table 3, the optical component demonstrated only trace delamination, indicating an improvement over the untreated samples of Example 1. The sample was visually clear.

TABLE 2

Testing of Optical Substrates Comprising Film Deposited on PMMA Substrates Pretreated with Direct He Exposure

| | | | | | | Tests at Room Temp. | | Tests at 97% RH | |
|---|---|---|---|---|---|---|---|---|---|
| SAMPLE | Time [min] | Flow f[sccm] | Pressure p[mtorr] | Power P[W]MW | Power V[V]RF | Tape Peel Test | MST Lc [N] | Tape Peel Test | MST Lc [N] |
| D | .5 | 20 | 200 | 150 | — | Peeling | — | — | — |
| E | 2 | " | " | " | — | " | — | — | — |
| F | 5 | " | 200 | " | — | " | — | — | — |
| G | 5 | " | 100 | " | — | Trace P. | 2.2 | Trace P. | 1.8 |
| H | " | " | " | " | 100 | Trace P. | 2.4 | Trace P. | 2.1 |
| I | 10 | " | " | " | " | " | 2.6 | " | 2.2 |
| J | 10 | 50 | 200 | " | — | " | 2.8 | " | 2.1 |
| K | 15 | " | " | " | — | No peel | 3.2 | " | 2.2 |
| L | " | " | " | " | — | Trace P. | — | " | — |
| M | " | " | " | — | 150 | No peel | 3.1 | " | 2.4 |
| N | " | " | " | — | " | Trace P. | — | " | — |
| O | 15 | " | " | 150 | — | Trace P. | — | " | — |
| P | 25 | " | " | " | — | No Peel | 3.9 | No peel | 2.7 |
| Q | 35 | " | " | " | — | " | 3.8 | " | 2.9 |

TABLE 3

Testing of Optical Substrate Comprising Film
Deposited on PMMA Substrate Pretreated with He/N$_2$ Direct Exposure

|  |  |  |  |  |  | Tests at Room Temp. | | Tests at 97% RH | |
|---|---|---|---|---|---|---|---|---|---|
| SAMPLE | Time [min] | Flow f[sccm] | Pressure p[mtorr] | Power P[W]MW | Power V[V]RF | Tape Peel Test | MST Lc [N] | Tape Peel Test | MST Lc [N] |
| R | 15/3 | 50 | 200 | 150 | — | Trace P. | — | Trace P. | — |

EXAMPLE 4

Testing of Optical Substrates Comprising Film
Deposited on PMMA Substrates Pretreated with
Remote H$_2$ Exposure 1. Pretreatment Method:

Rectangular plates of PMMA molded by reactive injection molding which were 2.5 millimeters thick, 75×15 mm in area were placed into a sample chamber of a double cavity system. The sample chamber was then pumped down to 10$^{-6}$ Torr. Each sample was separated by a MgF$_2$ filter window with a cut-off wavelength of 114 nm from the active plasma zone, such that wavelengths below 114 nm would not penetrate the window into the sample. An H$_2$ plasma source was placed about 80 cm from the sample in the plasma chamber with the window separating the sample in the sample chamber from the plasma source in the plasma chamber. A microwave power of about 300 W was used, with a flow rate of about 10 sccm and a pressure of about 100 mtorr within the plasma chamber.

2. Coating and Testing Method:

Following pretreatment, the substrates were exposed to laboratory air before the deposition of the optical film thereon. An amorphous silicon nitride film was then deposited on each plate according to the coating method discussed above in Example 1.

The optical components comprising the film deposited on the substrate were then inspected for adhesion using a scotch tape peel test (M610 type) and a microscratch test ("MST"). In the MST, a hemispherical Rockwell C diamond stylus was moved along the film surface, and a critical load, L$_c$, (measured in Newtons) was determined when the film started to delaminate from the interface.

After the first round of adhesion tests, which were at room temperature, each sample was exposed to a high humidity at an elevated temperature, relative humidity ("RH")=97%, 50 degrees C, for 24 hours, and the adhesion tests were repeated.

3. Test Results:

As shown in Table 4, upon reaching fifteen minutes of pretreatment, most samples of pretreated PMMA optical components exhibited only traces of delamination, i.e. decreased peeling ("Trace P.") or no peeling/delamination ("No peel") during a tape peel test, and significantly increased L$_c$ values, indicating an increased amount of force that is needed to tear a film off of the pretreated substrate compared to the untreated substrate of Example 1. The pretreated components also featured decreased peeling during a tape peel test following high humidity (97% RH) and temperature exposure for 24 hours compared to the untreated samples of Example 1. Thus, an improvement in adhesion for remote Hydrogen pretreatment was demonstrated over the untreated PMMA substrate of Example 1, which exhibited peeling rather than merely trace delamination or no delamination. The pretreated optical components were visually clear.

The highest adhesion was obtained after about 60 minutes of pretreatment, although this result may vary depending upon the other conditions of pressure, flow and power. It is also believed that different pressure conditions, flow conditions, and/or power conditions can decrease the amount of time required to achieve no delamination or peeling.

The microscratch test results and visual inspection for tape testing demonstrate good adhesion. The tests demonstrate a marked improvement in adhesion such as greater load-to-failure resulting from remote hydrogen treatment. Scratching required much greater force because of the adhering qualities resulting from pretreatment.

Hydrogen gas plasma emits electromagnetic energy having a wavelength of 121.5 nm, demonstrating that this wavelength successfully pretreats substrates for improved adhesion with optical films. The optical components tested were visually clear.

TABLE 4

Testing of Optical Substrates Comprising Film
Deposited on PMMA Substrates Pretreated with Remote H$_2$ Exposure

| Sample | Time [min] | Room Temp Tape peel test | Room Temp MST Lc [N] | 97% RH Tape Peel Test | 97% RH MST Lc [N] |
|---|---|---|---|---|---|
| S | 15 | Trace P. | 2.9 | — | — |
| T | 30 | No peel | 3.3 | Trace P. | 2.9 |
| U | 60 | " | 3.6 | — | — |
| V | 30 | " | 3.5 | Trace P. | 2.2 |
| W | 30 | " | 3.2 | " | 2.4 |
| X | 15 | Trace P. | 2.4 | " | 2.1 |
| Y | 60 | No peel | 3.7 | " | 2.9 |

Figure 6:
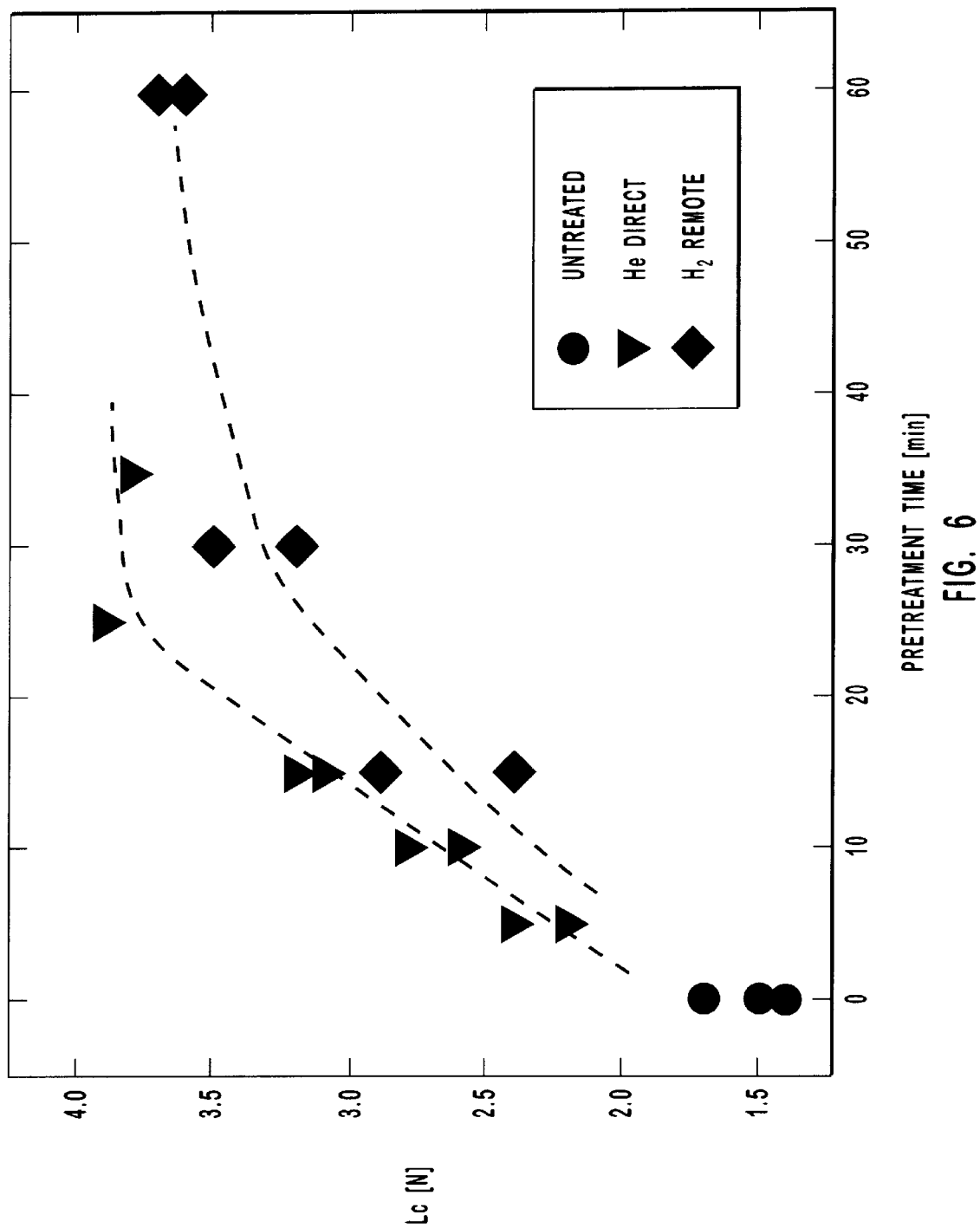
FIG. 6 is a graphical representation of the critical load values L, of optical components having a film deposited onto a PMMA substrate plotted against the amount of time the substrates were pretreated before receiving the film, demonstrating an improvement in adhesion resulting from treatment with remote Hydrogen and direct Helium plasma pretreatments over untreated samples.

The results of the room temperature microscratch tests of Examples 1, 2 and 4 are plotted in FIG. 6, demonstrating an improvement in adhesion resulting from treatment with remote Hydrogen and direct Helium plasma pretreatments over untreated samples.

In another test, under a combined remote/direct approach, a plasma chamber filled with hydrogen gas plasma at 200 mTorr, 20 sccm and 150 W microwave power was separated by a MgF$_2$ window having a cut-off wavelength of 114 nm from a PMMA sample in a sample compartment. The sample compartment had a hydrogen gas plasma at 200 mTorr, 20 sccm and 150 W microwave power therein. PMMA samples were thus treated within the sample compartment for one and two minute intervals and were subsequently coated. The resulting optical components exhibited peeling of the coated optical component upon visual evaluation at room temperature and during a tape peel test at room temperature. However, it is possible that the results would be improved under different conditions of pressure, time, and power.

EXAMPLE 5

Testing of Optical Substrates Comprising Film
Deposited on PMMA Substrates Pretreated with
Direct Exposure to Nitrogen Gas Plasma 1. Pretreatment. Coating and Testing Method:

Injection molded rectangular plates of PMMA were pretreated, coated, and tested as described in Example 2, except that the PMMA plates were subjected to direct exposure of nitrogen gas plasma at varying pressures, time intervals, and with varying flow rates, as summarized in Table 5. "MW" represents samples exposed directly to nitrogen gas plasma excited with microwave power of 150 W, while "rf" represents samples exposed to nitrogen gas plasma excited with radiofrequency power of 30 W, bias −150.

2. Coating and Testing Method:

An amorphous silicon nitride film was then deposited on each plate according to the coating method discussed above in Example 1. The film depositions and pretreatments were performed in the same chamber without breaking vacuum.

The optical components comprising the film deposited on the substrate were then inspected for adhesion using a scotch tape peel test (M610 type) and a microscratch test ("MST"). In the MST, a hemispherical Rockwell C diamond stylus was moved along the film surface, and a critical load, $L_c$, (measured in Newtons) was determined when the film started to delaminate from the interface. The samples were then inspected for adhesion using a visual evaluation ("Visual Eval.").

After the first round of adhesion tests, which were at room temperature, the samples were exposed to a high humidity at an elevated temperature, relative humidity ("RH")=97%, 50 degrees C, for 24 hours, and the visual evaluation and tape pull tests were repeated.

3. Test Results:

Nitrogen gas plasma exposure may slightly improve critical load values, demonstrating that some adhesion improvement is experienced. Nitrogen gas plasma emits weakly at a wavelength of 120 nm and emits stronger at 410 nm and above. It is believed that any improvement results, at least in part from the weak 120 nm wavelength emitted from Nitrogen gas plasma. However, possibly because the 120 nm emission is weak, any improvement is not as dramatic for PMMA as that experienced for Helium and Hydrogen gas plasmas, which emit at wavelengths less than about 350 nm. The optical components were visually clear.

In other tests, direct pretreatment of PMMA with gas plasmas derived from $NH_3$ or $N_2O$ excited by microwave power of 150 W, for one minute, at flow rate of 20 sccm and pressure of 200 mtorr exhibited peeling in a visual evaluation and tape peel test at room temperature. In yet another test, direct pretreatment of PMMA with gas plasma derived from $NH_3$ excited by rf power of 30 W, bias −150, for one minute, at flow rate of 20 sccm and pressure of 200 mtorr exhibited peeling in a visual evaluation and tape peel test at room temperature.

EXAMPLE 6

Testing of Optical Substrates Comprising Film Deposited on PMMA Substrates Pretreated with Argon Exposure 1. Pretreatment, Coating and Testing Method:

Rectangular plates of PMMA molded by reactive injection molding which were 2.5 millimeters thick, 75×15 mm in area were subjected to exposure of Argon gas plasma under conditions summarized in Table 6. The sample identified as "Direct MW" represents a sample exposed directly to argon excited with microwave power of 150 W, while the sample identified as "Direct rf" represents a sample exposed to argon excited with radiofrequency power of 30 W, bias −150. The samples identified as "Rem/Dir" represent samples exposed to argon applied both remotely and directly under the combined remote/direct approach discussed above in Example 2 with a microwave power of 150 W.

An amorphous silicon nitride film was then deposited onto each plate according to the coating method discussed above in Example 5, after which each resulting optical component was then tested as described in Example 5.

2. Test Results:

Argon emits electromagnetic energy at 104.8 nm and at visable wavelengths of 480 nm and greater. Particularly directly applied argon exposure slightly improves critical load values, demonstrating that some adhesion improvement is experienced. It is believed that this improvement results at least in part from the 104.8 nm electromagnetic energy emitted from Argon. The optical components were visually clear.

TABLE 5

Testing of Optical Substrates Comprising Film Deposited on PMMA Substrates Pretreated with Direct $N_2$ Exposure

| Power | Flow sccm | Pressure p[mTorr] | Time [seconds] | Room Temp Visual Eval. | Room Temp Tape Peel Test | Room Temp MST Lc [N] | 97% RH Visual Eval. | 97% RH Tape Peel Test |
|---|---|---|---|---|---|---|---|---|
| MW | 20 | 200 | 60 | Trace P. | Peeling | 1.8 | Peeling | Peeling |
| rf | " | " | 60 | Peeling | " | — | — | — |
| MW | " | " | 10 | No Peel | " | 1.4 | No Peel | Peeling |
| " | " | " | 30 | " | " | 1.6 | Peeling | " |
| " | " | " | 5 | " | " | 1.5 | No Peel | " |
| " | 50 | " | 10 | " | " | — | Peeling | " |
| " | " | " | 30 | Peeling | " | — | — | — |
| " | " | 800 | 5 | No Peel | " | 1.7 | No Peel | " |
| " | " | 500 | 30 | Trace P. | " | 1.6 | Peeling | " |
| " | " | " | 10 | No Peel | " | 2.1 | " | " |
| " | " | " | 60 | Peeling | " | — | — | — |
| " | " | 200 | " | Peeling | " | — | " | " |

TABLE 6

Testing of Optical Substrates Comprising Film Deposited on PMMA Substrates Pretreated with Argon Exposure

| Exposure | Flow sccm | Pressure [mTorr] | Time [min] | Room Temp Visual Eval. | Room Temp Tape Peel Test | Room Temp MST Lc [N] | 97% RH Visual Eval. | 97% RH Tape Peel Test |
|---|---|---|---|---|---|---|---|---|
| Direct MW | 20 | 200 | 1 | No Peel | Peeling | 2.1 | No Peel | Peeling |
| Direct rf | " | " | 1 | Trace P. | " | 1.8 | Peeling | — |
| Rem/Dir | " | " | 1 | " | " | 1.6 | Peeling | Peeling |
| Rem/Dir | " | " | 0.5 | Peeling | " | — | — | — |
| Rem/Dir | " | " | 2 | No Peel | " | 1.5 | Peeling | " |

EXAMPLE 7

Testing of Optical Substrates Comprising Film Deposited on Untreated Polycarbonate Substrates 1 Coating and Testing Method:

Untreated rectangular plates of reactive injection molded polycarbonate which were 2.5 millimeters thick, 75×15 mm in area were coated with about 500 nm thick hydrogenated amorphous silicon nitride ($SiN_{1.3}$) film under MW/RF conditions as discussed above in Example 1, after which the resulting optical component was then tested as described in Example 1.

2. Test Results

The results of the tests are demonstrated in Table 7, which shows the critical load values for polycarbonate.

TABLE 7

Testing of Optical Substrates Comprising Film Deposited on Untreated Polycarbonate Substrates

| Sample | Visual Eval. Room Temp | Tape Peel Test Room Temp. | Microscratch Test Lc[N] Room Temp. | Visual Eval. 97% RH | Tape Peel Test 97% RH |
|---|---|---|---|---|---|
| Untreated | No Peel | No Peel | 3 | No Peel | No Peel |
| Untreated | No Peel | No Peel | 3.3 | No Peel | No Peel |
| Untreated | No Peel | No Peel | 3.2 | No Peel | No Peel |

EXAMPLE 8

Testing of Optical Substrates Comprising Film Deposited on Treated Polycarbonate Substrates 1. Pretreatment, Coating and Testing Method:

Rectangular plates of polycarbonate molded by reactive injection molding which were 2.5 millimeters thick, 75×15 mm in area were subjected to exposure of various gas plasmas under conditions summarized in Tables 8 and 9. The samples identified as "Direct MW" represents samples exposed directly to gas plasma excited with microwave power of 150 W, while the samples identified as "Direct rf" represent samples exposed to gas plasma excited with radiofrequency power of 30 W, bias −150. The samples identified as "Rem/Dir" represent samples exposed to gas plasmas applied both remotely and directly under the combined remote/direct approach discussed above in Example 2 with a microwave power of 150 W. Each of the samples in Table 8 was pretreated at a flow rate of about 20 sccm and at a pressure of about 200 mTorr. Each of the samples in Table 9 was pretreated for approximately 1 minute.

An amorphous silicon nitride film was then deposited onto each plate according to the coating method discussed above in Example 5, after which each resulting optical component was then tested as described in Example 5.

3. Test Results:

The pretreatment generally enhanced adhesion to film subsequently deposited onto the polycarbonate substrates, as indicated in Tables 8 and 9. The pretreated optical components were visually clear.

As shown in Tables 8 and 9, pretreated polycarbonate samples generally featured increased $L_c$ values, indicating an increased amount of force that is needed to tear a film off of the pretreated substrate compared to the untreated substrate of Example 7. The pretreated components also generally featured decreased peeling following high humidity (97% RH) and temperature exposure compared to the untreated sample of Example 1.

The microscratch test results and visual inspection for tape testing demonstrate good adhesion. The tests demonstrate a marked improvement in adhesion such as greater load-to-failure resulting from remote hydrogen treatment. Nitrogen gas plasma emits weakly at a wavelength of 120 nm, while argon emits electromagnetic energy at 104.8 nm.

It is believed that the adhesion improvements experienced result at least in part from the 104.8 nm electromagnetic energy emitted from Argon and the weak 120 nm wavelength emitted from Nitrogen gas plasma.

TABLE 8

Testing of Optical Substrates Comprising Film Deposited
On Pretreated Polycarbonate Substrates

| Exposure | Gas Plasma | Time [min] | Visual Eval. Room Temp. | Tape Peel Test Room Temp. | MST Lc [N] Room Temp. | Visual Eval. 97% RH | Tape Peel Test 97% RH |
|---|---|---|---|---|---|---|---|
| DirectMW | $N_2$ | 1 | No Peel | No Peel | 4.8 | No Peel | No peel |
| Direct rf | $N_2$ | 1 | " | " | 4.6 | " | " |
| Direct MW | Ar | 1 | " | " | 4.8 | " | " |
| Direct rf | Ar | 1 | " | " | 4.7 | " | " |
| Direct MW | $H_2$ | 1 | " | " | 3.1 | Peeling | Peeling |
| Direct rf | $H_2$ | 1 | " | " | 3.7 | No Peel | No peel |
| Rem/Dir | Ar | 1 | " | " | 3.6 | " | " |
| " | $H_2$ | 1 | " | " | 3.4 | " | " |
| " | Ar | .5 | " | " | 3.6 | " | " |
| " | Ar | 2 | " | " | 3.9 | " | " |
| " | $H_2$ | 2 | " | " | 3.3 | " | " |
| Direct MW | NH3 | 1 | " | " | 3.6 | Trace P. | Peeling |
| Direct rf | NH3 | 1 | " | " | 2.9 | No peel | No Peel |
| Direct MW | N20 | 1 | " | " | 4.1 | Peeling | Peeling |

TABLE 9

Testing of Optical Substrates Comprising Film
Deposited on Polycarbonate Substrates Pretreated with Direct $N_2$ Exposure

| | | | Tests at Room Temp. | | Tests at 97% RH | |
|---|---|---|---|---|---|---|
| Time [min] | Flow f[sccm] | Pressure p[mtorr] | MST Lc [N] | Tape Peel Test | Tape Peel Test | MST Lc [N] |
| 10 | 20 | 200 | 3.3 | No peel | No peel | — |
| 30 | " | " | 3.8 | " | " | 4 |
| 5 | " | " | 3.3 | " | " | — |
| 10 | 50 | " | 3.6 | " | " | — |
| 30 | " | " | 3.8 | " | " | 3.6 |
| 5 | " | 800 | 3.9 | " | Peeling | — |
| 30 | 50 | 500 | 3.7 | " | No peel | — |
| 10 | " | " | 3.8 | " | Peeling | — |
| 60 | " | " | 4.4 | " | No Peel | 4.1 |
| " | " | 200 | 4.2 | " | " | — |

In the visual evaluation of the optical components of Table 9, all of the components exhibited no peeling during both room temperature and 97% RH tests, except the sample treated for five minutes at 800 mtorr, which exhibited peeling at 97% RH and the sample treated for ten minutes at 500 mtorr, which exhibited trace peeling at 97% RH.

EXAMPLE 9

Chemical Composition and Roughness of Treated and Untreated PMMA

Figure 8A:
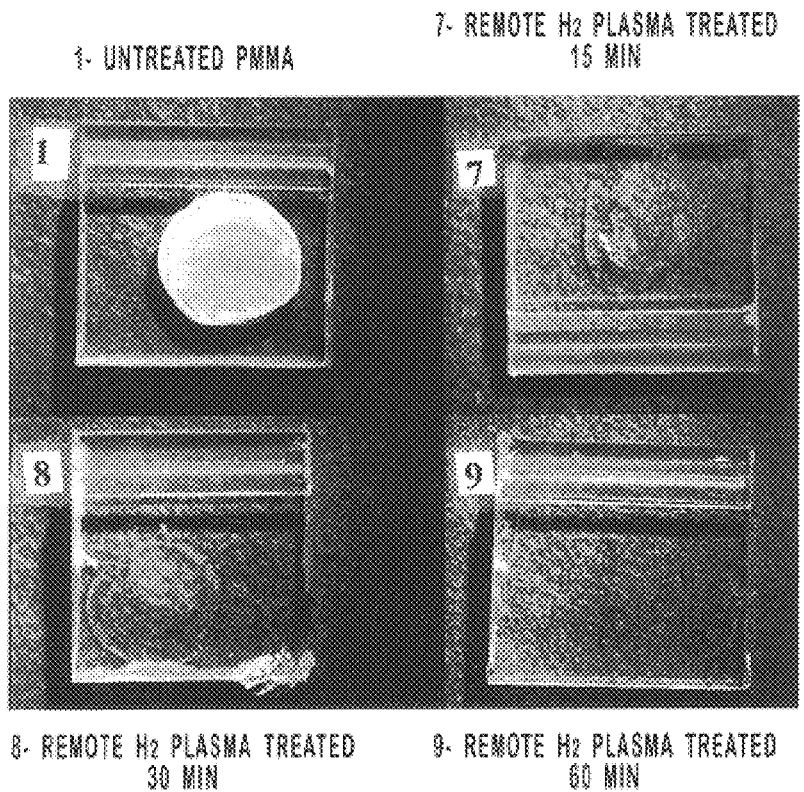
FIGS. 8a and 8b are a collection of pictures of samples of PMMA which have had a drop of acetone placed thereon taken at a magnification of 10×, demonstrating the extent of the damage caused by the acetone. Unpretreated PMMA sample 1 shows the most acetone damage while samples 7–10, which increase respectively in time (provided in minutes ("min")) of pretreatment with remote exposure to Hydrogen plasma, demonstrate more resistance to acetone damage than unpretreated sample 1. The time of pretreatment of samples 7–10 is indicated adjacent each sample.
Figure 8B:
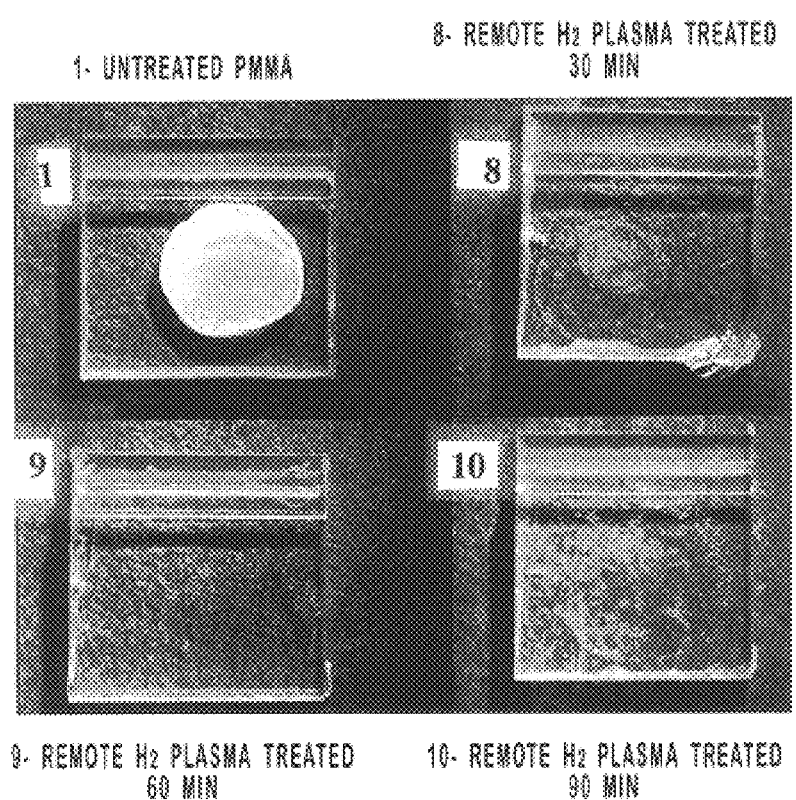
Figure 9:
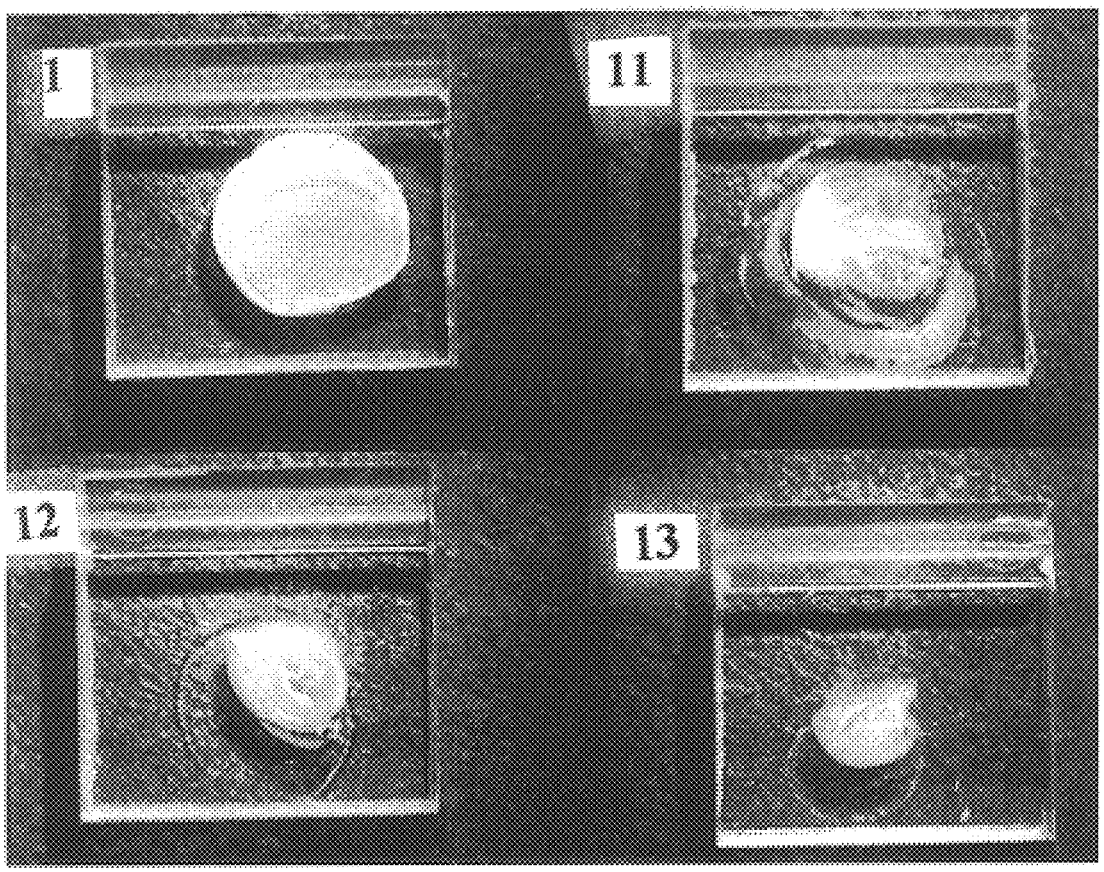
FIG. 9 is a collection of pictures of samples of PMMA which have had a drop of acetone placed thereon taken at a magnification of 10×, demonstrating the extent of the damage caused by the acetone. Unpretreated PMMA sample 1 shows the most acetone damage while samples 11–13, which increase respectively in time (provided in minutes ("min")) of pretreatment with remote exposure to Helium plasma demonstrate more resistance to acetone damage than unpretreated sample 1. The time of pretreatment of samples 11–13 is indicated adjacent each sample.

1. Treatment Method:

As shown in Tables 10 and 11, and FIGS. 7–9, certain PMMA plates were treated as described in the direct exposure pretreatment method of Example 2 (see "Direct He"), except that the PMMA plates were each directly exposed to helium plasmas using a flow rate of 30 sccm and a pressure of about 200 mTorr and a microwave power of 150 W for varying time intervals.

Also as shown in Tables 10 and 11 and FIGS. 7–9, other plates were treated under either remote Helium or remote Hydrogen plasma gas circumstances (see "Remote H2" and "Remote He") in which radiation from one of the plasma gases was generated in a microwave cavity (quartz tube 19 mm in diameter). In the remote scenarios, the sample compartment had a pressure of $10^{-6}$ Torr. The sample was separated by a $MgF_2$ window with a cut-off wavelength of 114 nm from the active plasma zone. The gas plasmas in the plasmas zone each had a pressure of about 200 mTorr, a flow rate of 100 sccm and a microwave power of 100 W and were treated for varying time intervals.

The results of various tests under these conditions are shown in Tables 10 and 11, and in FIGS. 7–9.

2. Testing Method and Results

Table 10 demonstrates the elemental composition of certain treated and untreated PMMA samples measured at different take-off angles for different treatment conditions using X-ray photoelectron spectroscopy (XPS) measurements. The XPS measurements were performed in a VG-ESCALAB Mk-II instrument using $MgK_\alpha$ (1253.6 eV) radiation, with 50 eV pass energy for broad scans, and 20 eV for high resolution scans. Measurements were performed at different take-off angles to determine the chemical structure at different depths.

As shown in Table 10, the percentage of the principal constituents of carbon and oxygen changes with treatment time of the various treatments, are compared to an untreated sample of PMMA. Carbon concentration increases with treatment time while the oxygen concentration decreases with treatment time as a consequence of chemical change. Trace concentrations of N and Si, are believed to be present in direct samples as a result of treatment within the same chamber in which deposition of film had been previously carried out, while trace concentrations of fluorine are believed to be present as a result of remote exposure through the $MgF_2$ window.

The chemical changes, coupled with improved adhesion, suggests the creation of improved chemical bonding sites for optical coatings treated according to the present invention. This chemical change also demonstrates that the pretreatment method of the present invention alters the ratio of carbon and oxygen within the substrate.

TABLE 10

Chemical Composition of PMMA
At Different Take-off Angles after Various Treatments

| PMMA Treatment and Time in Minutes | Ang. [deg.] | C [%] | O [%] | N [%] | Si [%] | F [%] |
|---|---|---|---|---|---|---|
| untreated | 90 | 73.2 | 25.3 | 1.1 | 0.4 | — |
| Direct He (5 min.) | 90 | 74.2 | 23.9 | 1.3 | 0.6 | — |
| " | 45 | 75.0 | 23.1 | 1.1 | 0.8 | — |
| " | 20 | 76.5 | 21.4 | 0.8 | 1.3 | — |
| Direct He (10 min.) | 90 | 77.6 | 19.8 | 1.2 | 1.4 | — |
| " | 45 | 78.2 | 19.1 | 1.2 | 1.5 | — |
| " | 20 | 79.0 | 17.9 | 1.5 | 1.6 | — |
| Direct He (25 min.) | 90 | 80.2 | 16.8 | 1.4 | 1.6 | — |
| " | 45 | 81.4 | 15.0 | 1.7 | 1.9 | — |
| " | 20 | 82.0 | 14.3 | 1.8 | 1.9 | — |
| Direct He (35 min.) | 90 | 83.3 | 13.5 | 1.6 | 1.6 | — |
| " | 45 | 85.1 | 11.2 | 1.8 | 1.9 | — |
| " | 20 | 86.0 | 9.4 | 2.4 | 2.2 | — |
| Remote $H_2$ (15 min.) | 90 | 80.1 | 17.7 | — | 0.7 | 1.5 |
| " | 45 | 82.4 | 15.1 | — | 0.8 | 1.7 |
| " | 20 | 83.0 | 14.6 | — | 0.9 | 1.5 |
| Remote $H_2$ (30 min.) | 90 | 85.0 | 11.6 | — | 0.7 | 2.8 |
| " | 45 | 86.2 | 11.0 | — | 0.8 | 2.0 |
| " | 20 | 88.1 | 9.1 | — | 0.8 | 2.0 |
| Remote $H_2$ (60 min.) | 90 | 87.1 | 8.2 | — | 1.5 | 3.2 |
| " | 45 | 87.9 | 7.7 | — | 1.4 | 3.0 |
| " | 20 | 88.1 | 7.6 | — | 1.5 | 2.8 |
| Remote $H_2$ (90 min.) | 90 | 88.0 | 6.9 | — | 1.5 | 3.6 |
| " | 45 | 88.5 | 6.9 | — | 1.2 | 3.4 |
| " | 20 | 88.4 | 6.7 | — | 1.3 | 3.6 |
| Remote He (15 min.) | 90 | 74.4 | 23.4 | — | 0.7 | 1.5 |
| Remote He (30 min.) | " | 73.6 | 21.7 | — | 1.5 | 3.2 |
| Remote He (60 min.) | " | 73.0 | 20.6 | — | 1.8 | 4.6 |

Thus, one embodiment of the present invention is a method for creating chemical bonding sites on a polymeric optical substrate in order to improve adhesion of an optical coating to the substrate. As shown, the method comprises altering the ratio of carbon and oxygen within the portion of the substrate treated. It is believed that further pretreatment, through additional treatment time, for example would increase the carbon to oxygen ratio and continue to result in improved adhesion from an untreated sample.

In one embodiment, the method increases the ratio of carbon to oxygen to a ratio in the range of about 3 to about 1, respectively, to about 25 to about 1, respectively. In another embodiment, the method increases the ratio of carbon to oxygen to a ratio in the range of about 3 carbon atoms to about 1 oxygen atom to about 20 carbon atoms to about 1 oxygen atom. In another embodiment, the method increases the ratio of carbon to oxygen to a ratio in the range of about 3 carbon atoms to about 1 oxygen atom to about 15 carbon atoms to about 1 oxygen atom. In other embodiments, the method increases the ratio of carbon to oxygen to a ratio in the range of about 3 to about 1, respectively, to about 10 to 1, respectively, or about 5 to about 1, or about 4 to about 1, respectively.

Atomic force microscopy images of untreated and pretreated PMMA samples are shown in Table 11 below. Certain pretreatments involved direct helium exposure (see "Direct He"), while others involved remote hydrogen exposure (see "Remote $H_2$"), using the conditions discussed above in this example. One can conclude from Table 11 that the roughness increases with direct exposure to helium, while it decreases upon remote exposure to hydrogen. This may be related to a higher ablation rate in the helium plasma due to a higher electromagnetic energy impact, including ions and surface heating, for example.

TABLE 11

Atomic Force Microscopy (AFM) Test of PMMA
Carried Out Using Topometrix Instrument

| PMMA Treatment | Time | Roughness (nm) Ra | Roughness (nm) RMS |
|---|---|---|---|
| Untreated | | 5.4 | 6.7 |
| Direct He | (5 min.) | 5.4 | 6.8 |
| Direct He | (25 min.) | 6.3 | 8.1 |
| Direct He | (35 min.) | 7.0 | 10.0 |
| Remote $H_2$ | (15 min.) | 5.2 | 6.4 |
| Remote $H_2$ | (60 min.) | 3.6 | 4.4 |
| Remote $H_2$ | (90 min.) | 1.6 | 2.1 |

Tables 10 and 11 in combination, demonstrate that whether the surface is roughened, as in the direct He plasma treatments or smoothed, as in the remote $H_2$ treatment scenario, the PMMA substrate undergoes a chemical change, which, as seen in the foregoing examples results in improved adhesion to optical films deposited through a variety of different processes. This suggests the presence of a cross-linked surface layer which was found to be up to about 100 nm thick, possibly about 40 nm to about 80 nm thick. This cross-linked layer mechanically stabilizes the surface (increased Young's modulus and hardness).

FIGS. 7–9

The presence of a cross-linked surface layer has further been confirmed by the surface solubility of pretreated PMMA in acetone as illustrated in FIGS. 7 through 9, each of which represents pictures taken at a magnification of 10× following the placement of a drop of acetone onto treated and untreated PMMA substrates.

The solubility of the pretreated PMMA clearly decreases when the substrates are pretreated according to the present invention. Thus, the chemical reaction occurring upon treatment with the disclosed electromagnetic energy ranges improves the adhesion of films to the substrate and improves the substrate's resistance to chemical degradation from acetone and other chemicals.

Figure 7A:
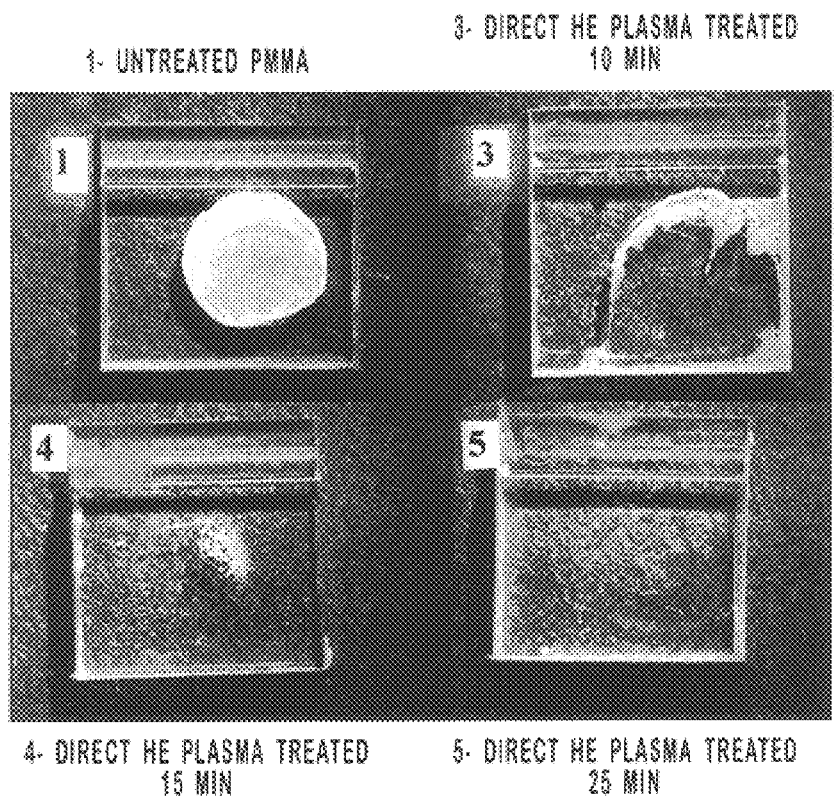
FIGS. 7a and 7b are a collection of pictures of samples of PMMA which have had a drop of acetone placed thereon taken at a magnification of 10×, demonstrating the extent of the damage caused by the acetone. Unpretreated PMMA sample 1 shows the most acetone damage while samples 2–6, which increase respectively in time (provided in minutes ("min")) of pretreatment with direct exposure to Helium plasma, demonstrate more resistance to acetone damage than unpretreated sample 1. The time of pretreatment of samples 2–6 is indicated adjacent each sample.
Figure 7B:
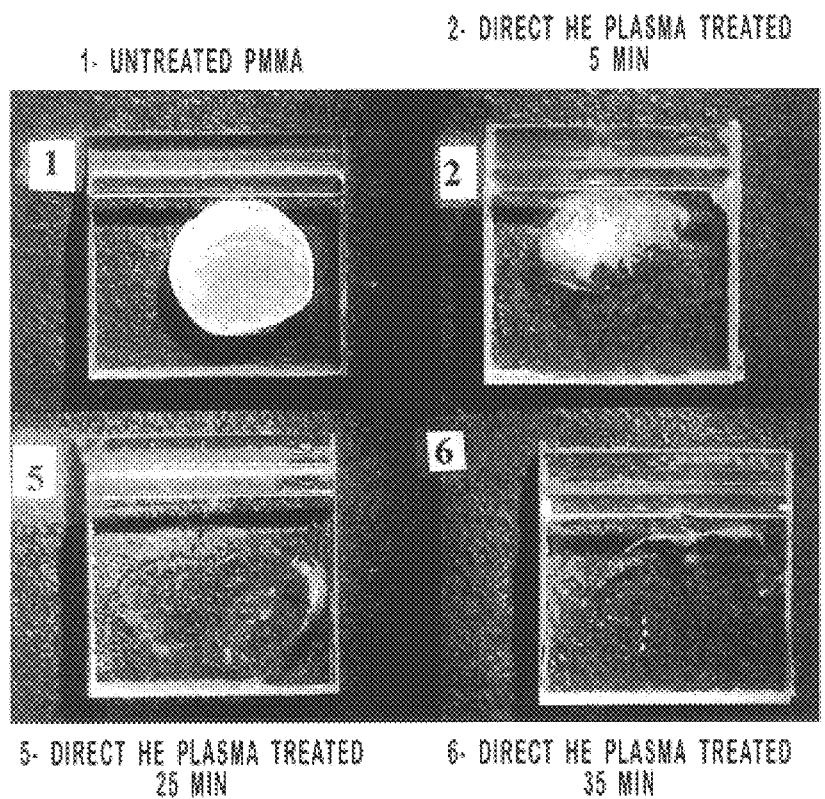

As shown in FIGS. 7a and 7b, untreated PMMA, sample 1, is degraded significantly by acetone, while pretreated PMMA samples 2–6, which increase respectively in time of exposure to direct Helium gas plasma exposure, show decreased acetone degradation with respect to sample 1.

As shown in FIGS. 8a and 8b, untreated PMMA, sample 1, is degraded significantly by acetone, while pretreated PMMA samples 7–10, which increase respectively in time of exposure to remote hydrogen gas plasma exposure, show decreased acetone degradation with respect to sample 1.

As shown in FIG. 9, untreated PMMA, sample 1, is degraded significantly by acetone, while pretreated PMMA samples 11–13, which increase respectively in time of exposure to remote helium gas plasma exposure, show decreased acetone degradation with respect to sample 1.

The pretreatment process of the present invention creates improved chemical bonding sites for optical coatings by chemically altering the surface of the substrate. This chemical change includes crosslinking and hardening of the surface and occurs whether the surface is roughened or smoothed.

COMPARATIVE EXAMPLE 10

Pretreatment of PMMA with Mercury Lamp

In one test, irradiation of PMMA samples with a mercury lamp emitting 365 nm energy in laboratory air for time intervals of 60 and 360 minutes did not significantly improve adhesion between the PMMA substrate and a film subsequently deposited onto the substrate.

In another test, pretreatment of a PMMA sample with the lamp for two days in laboratory air at a sample distance of 15 mm decreased the percentage of carbon to 71.8% and increased the percentage of oxygen to 26%, with 1.2% silicon and 1% fluorine as trace elements believed to be contaminants from the testing environment (as measured from a take off angle of 90 degrees).

These results are surprising. Although pretreatment of PMMA with a 365 nm wavelength emitting mercury lamp did not significantly improve adhesion between the substrate and an optical coating subsequently deposited onto the substrate, the higher electromagnetic energy process of the present invention significantly improves adhesion between substrates such as PMMA and coatings subsequently deposited thereon.

Helium gas plasma, for example, emits electromagnetic energy having wavelengths of 164 nm and 58 nm, demonstrating that these wavelengths successfully pretreat substrates for improved adhesion with optical films. In addition, hydrogen gas plasma emits electromagnetic energy having a wavelength of 121.5 nm, demonstrating that this wavelength successfully pretreats substrates for improved adhesion with optical films. The good results of these and other gas plasmas discussed herein demonstrate that the step of exposing polymeric optical substrates to electromagnetic energy having a wavelength in the range of about 30 nm to about 350 nm strengthens the substrates and improves adhesion between the substrates and optical films deposited thereon.

Surprisingly, even though PMMA is generally more sensitive than other substrate materials, the shorter wavelength, higher electromagnetic energy process of the present invention improves adhesion between PMMA and optical coatings deposited thereon while the lower energy 365 nm mercury lamp did not improve adhesion. Adhesion is improved whether the surface is roughened or smoothed. As mentioned above, for example, the results of the room temperature microscratch tests of Examples 1, 2 and 4 are plotted in FIG. 6, demonstrating an improvement in adhesion to PMMA resulting from treatment with remote hydrogen and direct helium plasma pretreatments. The method of the present invention also features strengthening of the surface of a treated substrate, as shown in a variety of different tests.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for manufacturing an optical component, comprising:
   (a) obtaining a polymeric optical substrate;
   (b) providing a gas plasma which produces electromagnetic energy in at least a portion of a wavelength range of about 30 nm to about 350 nm, the gas plasma selected from the group consisting of hydrogen gas plasma, helium gas plasma, nitrogen gas plasma, and combinations thereof;
   (c) directly exposing the polymeric optical substrate to the gas plasma to form a pretreated interface layer on the optical substrate; and
   (d) forming an optical coating on the pretreated interface layer by a vacuum deposition process.

2. The method of claim 1, wherein the polymeric optical substrate comprises a material selected from the group consisting of polycarbonate, polyethylene terephthalate, polyimide, polystyrene, polyester, polyethylene, epoxy containing polymers, and mixtures or derivatives thereof.

3. The method of claim 1, wherein the polymeric optical substrate comprises an acrylate containing polymer.

4. The method of claim 1, wherein the gas plasma comprises helium gas plasma.

5. The method of claim 1, wherein the pretreated layer enhances adhesion between the optical substrate and the optical coating.

6. A method for manufacturing an optical component, comprising:
   (a) obtaining a polymeric optical substrate;
   (b) providing a gas plasma which produces electromagnetic energy in at least a portion of a wavelength range to about 350 nm, the gas plasma selected from the group consisting of hydrogen gas plasma, helium gas plasma, nitrogen gas plasma, and combinations thereof;
   (c) remotely exposing the polymeric optical substrate to at least a portion of the electromagnetic energy produced by the gas plasma to form a pretreated interface layer on the optical substrate; and
   (d) forming an optical coating on the pretreated interface layer by a vacuum deposition process.

7. The method of claim 6, wherein the polymeric optical substrate comprises a material selected from the group consisting of polycarbonate, polyethylene terephthalate, polyimide, polystyrene, polyester, polyethylene, epoxy containing polymers, and mixtures or derivatives thereof.

8. The method of claim 6, wherein the polymeric optical substrate comprises an acrylate containing polymer.

9. The method of claim 6, wherein the gas plasma comprises hydrogen gas plasma.

10. The method of claim 6, wherein the pretreated interface layer enhances adhesion between the optical substrate and the optical coating.

11. A method for manufacturing an optical component, comprising:
    (a) obtaining a polymeric optical substrate comprising polymethylmethacrylate;
    (b) providing a gas plasma which produces electromagnetic energy in at least a portion of a wavelength range of about 30 nm to about 350 nm, the gas plasma selected from the group consisting of hydrogen gas plasma, helium gas plasma, nitrogen gas plasma, and combinations thereof;
    (c) directly exposing the polymeric optical substrate to the gas plasma to form a pretreated interface layer on the optical substrate; and
    (d) forming an optical coating on the pretreated interface layer by a vacuum deposition process, the optical coating comprising a material selected from the group consisting of silicon nitride, titania, tantala, niobia, zirconia, alumina, silicon dioxide, and mixtures or derivatives thereof.

12. The method of claim 11, wherein the gas plasma comprises helium gas plasma.

13. The method of claim 11, wherein the pretreated interface layer enhances adhesion between the optical substrate and the optical coating.

14. A method for manufacturing an optical component, comprising:

(a) obtaining a polymeric optical substrate comprising polymethylmethacrylate;
(b) providing a gas plasma which produces electromagnetic energy in at least a portion of a wavelength range of about 30 nm to about 350 nm, the gas plasma selected from the group consisting of hydrogen gas plasma, helium gas plasma, nitrogen gas plasma, and combinations thereof;
(c) remotely exposing the polymeric optical substrate to at least a portion of the electromagnetic energy produced by the gas plasma to form a pretreated interface layer on the optical substrate; and
(d) forming an optical coating on the pretreated interface layer by a vacuum deposition process, the optical coating comprising a material selected from the group consisting of silicon nitride, titania, tantala, niobia, zirconia, alumina, silicon dioxide, and mixtures or derivatives thereof.

15. The method of claim 14, wherein the gas plasma comprises hydrogen gas plasma.

16. The method of claim 14, wherein the pretreated interface layer enhances adhesion between the optical substrate and the optical coating.

17. A method for improving the adhesion of an optical coating applied to a polymeric optical substrate, the method comprising:
(a) obtaining a polymeric optical substrate comprising carbon and oxygen;
(b) providing a gas plasma which produces electromagnetic energy in at least a portion of a wavelength range of about 30 nm to about 350 nm, the gas plasma selected from the group consisting of hydrogen gas plasma, helium gas plasma, nitrogen gas plasma, and combinations thereof;
(c) exposing the polymeric optical substrate to at least one of:
  (i) the gas plasma; and
  (ii) at least a portion of the electromagnetic energy produced by the gas plasma, to form a pretreated interface layer on the optical substrate having enhanced adhesion for an optical coating, the pretreated interface layer having an increased ratio of carbon to oxygen compared to the remaining portion of the substrate such that the ratio of carbon to oxygen in the interface layer is from about 3:1 to about 25:1; and
(d) forming an optical coating on the pretreated interface layer by a vacuum deposition process.

18. The method according to claim 17, wherein the pretreated interface layer has a thickness from about 5 nm to about 100 nm.

19. The method of claim 17, wherein the ratio of carbon to oxygen in the interface layer is from about 3:1 to about 15:1.

20. The method of claim 17, wherein the amount of carbon in the interface layer is increased with respect to the amount of carbon in the remaining portion of the substrate by at least about 0.5 atomic percent.

21. The method of claim 17, wherein the amount of carbon in the interface layer is increased with respect to the amount of carbon in the remaining portion of the substrate by about 0.5 atomic percent to about 50 atomic percent.

22. The method of claim 17, wherein the amount of carbon in the interface layer is increased with respect to the amount of carbon in the remaining portion of the substrate by about 1 atomic percent to about 15 atomic percent.

23. A method for manufacturing an optical component, comprising:
(a) obtaining a polymeric optical substrate;
(b) providing a gas plasma which produces electromagnetic energy in at least a portion of a wavelength range of about 30 nm to about 350 nm, the gas plasma selected from the group consisting of hydrogen gas plasma, helium gas plasma, nitrogen gas plasma, and combinations thereof;
(c) exposing the polymeric optical substrate to at least a portion of the electromagnetic energy produced by the gas plasma to form a pretreated interface layer on the optical substrate; and
(d) forming an optical coating on the pretreated interface layer, the optical coating comprising a material selected from the group consisting of silicon nitride, titania, tantala, niobia, zirconia, alumina, silicon dioxide, and mixtures or derivatives thereof.

24. The method of claim 23, wherein the optical coating is formed by a vacuum deposition process selected from the group consisting of chemical vapor deposition, plasma chemical vapor deposition, evaporation, and sputtering.

* * * * *

UNITED STATES PATENT AND TRADEMARK OFFICE
CERTIFICATE OF CORRECTION

PATENT NO. : 6,156,394
DATED : December 5, 2000
INVENTOR(S) : Nancy Lee Schultz Yamasaki; Ludvik Martinu; Jolanta E. Klemberg- Sapieha It is certified that error appears in the above-identified patent and that said Letters Patent is hereby corrected as shown below:

Column 24,
Line 12, after "wherein the pretreated" insert -- interface --.
Line 20, before "to about 350 nm" insert -- of about 30 nm --

Signed and Sealed this

Fifth Day of March, 2002

Attest:

JAMES E. ROGAN
*Director of the United States Patent and Trademark Office*

*Attesting Officer*